United States Patent
Ali

(10) Patent No.: US 6,895,093 B1
(45) Date of Patent: May 17, 2005

(54) ACOUSTIC ECHO-CANCELLATION SYSTEM

(75) Inventor: Murtaza Ali, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/261,913

(22) Filed: Mar. 3, 1999

Related U.S. Application Data

(60) Provisional application No. 60/076,575, filed on Mar. 3, 1998.

(51) Int. Cl.[7] .............................................. H04B 3/00

(52) U.S. Cl. ..................... 381/66; 381/93; 379/406.01

(58) Field of Search .............................. 381/66, 93, 17; 379/486.01, 406.05, 406.06, 406.08, 406.09

(56) References Cited

U.S. PATENT DOCUMENTS

| | | | | |
|---|---|---|---|---|
| 4,063,034 A | * | 12/1977 | Peters ........................... | 381/17 |
| 5,661,813 A | * | 8/1997 | Shimauchi et al. ........... | 381/66 |

OTHER PUBLICATIONS

Ali, Murtaza Stereophonic Acoustic Echo Cancellation System Using Time–Varying All–Pass Filtering For Signal Decorrelation ICASSP '98. proceedings of the 1998 IEEE International Conference on, vol. 6, May 12–15, 1998, pp. 3689–3692 vol. 6.*

Jacob Benesty et al., "A Better Understanding and an Improved Solution to the Problems of Stereophonic Acoustic Echo Cancellation," *IEEE*, pp. 303–306, 1997.

Suehiro Shimauchi and Shoji Makino, "Stereo Projection Echo Canceller with True Echo Path Estimation," *IEEE*, pp. 3059–3062, 1995.

M. Mohan Sondhi et al., "Stereophonic Acoustic Echo Cancellation–An Overview of the Fundamental Problem," *IEEE Signal Processing Letters*, vol. 2, No. 8, pp. 148–151, Aug. 1995.

* cited by examiner

*Primary Examiner*—Ping Lee
(74) *Attorney, Agent, or Firm*—W. James Brady, III; Frederick J. Telecky, Jr.

(57) ABSTRACT

A multi-channel acoustic cancellation system 40 with, for example, stereo speakers and a pair of microphones in the transmitting and receiving rooms (11 and 21) has time varying all-pass filters (45, 47) in the signal path between the microphones (13, 15) in the transmitting room (11) and the speakers (27, 29) in the receiving room (21) to provide decorrelation.

10 Claims, 3 Drawing Sheets

ACOUSTIC ECHO-CANCELLATION SYSTEM

This application claims priority under 35 USC §119(e)(1) of provisional application No. 60/076,575, filed Mar. 3, 1998.

FIELD OF INVENTION

This invention relates to multi-channel acoustic echo cancellation system and more particularly to a cancellation system using time-varying all-pass filtering for signal decorrelation.

BACKGROUND OF INVENTION

At present, most teleconferencing systems use a single full-duplex audio channel for voice communications. These systems also make use of an acoustic echo canceller to reduce the undesired echo resulting from the coupling between the loudspeaker and the microphone. To make these systems more lifelike, better and more realistic sound systems are required. High fidelity wide bandwidth (100 to 7000 Hz) voice communication system is now being used. However, in order to introduce spatial realism, more than one channel is needed. Therefore, future teleconferencing systems are expected to have more than one channel (at least stereo with two channels) of full duplex voice communications.

One of the fundamental problems in stereophonic acoustic echo cancellation (AEC) systems is that given the input to the loudspeakers and the output of the microphones in the receiving room, the echo path cannot be determined uniquely. See for example the following references: J. Benesty, D. R. Morgan and M. M. Sondhi, "A Better Understanding and an Improved Solution to the Problems of Stereophonic Acoustic Echo Cancellation," Preprint, *Proceedings of ICASSP*-97, Vol. 1, pp. 303–306, Munich, Germany, Apr. 21–24, 1997; J. Benesty, P. Duhamel and Y. Grenier, "Multi-Channel Adaptive Filtering Applied to Multi-Channel Acoustic Echo Cancellation," Preprint, Submitted to *IEEE Trans. on Signal Processing,* April 1995; S. Shimauchi and S. Makino, "Stereo Projection Echo Canceller with True Echo Path Estimation," *Proceedings of ICASSP*-95, pp. 3059–3062, 1995; and M. M. Sondhi, D. R. Morgan and J. L. Hall, "Stereophonic Acoustic Echo Cancellation—An Overview of the Fundamental Problem," *IEEE Signal Processing Letters,* Vol. 2, No. 8, pp. 148–151, Auguest 1995. The problem is due to the correlation between the stereo signals. As a result, any adaptive technique used in stereophonic AEC systems fails to identify the echo path responses correctly. To circumvent this problem, it is necessary to develop techniques to decorrelate the stereo signals at the input to the loudspeakers without affecting stereo perception.

Several techniques have been proposed in the past, e.g., addition of random noise, modulation of signal, decorrelation, filters, inter-channel frequency shifting etc. However, these techniques either do not correlate the signals or destroy stereo perception completely. The interleaving comb filtering proposed in Sondhi et al. cited above only gives partial identification (above 1 kHz) of the echo path responses. Recently, a technique is proposed in Benesty et al. cited above based on non-linear processing of the stereo signals. However, as noted by the authors of Benesty et al., for tonal signal, the technique based on non-linearly cannot maintain transparency in perception (changes the pitch perception).

SUMMARY OF INVENTION

In accordance with one embodiment of the present invention, a multi-channel acoustic cancellation system includes time-varying all-pass filtering in signal paths to provide decorrelation of signals.

IN THE DRAWINGS

DESCRIPTION OF PREFERRED EMBODIMENT OF PRESENT INVENTION

Figure 1:
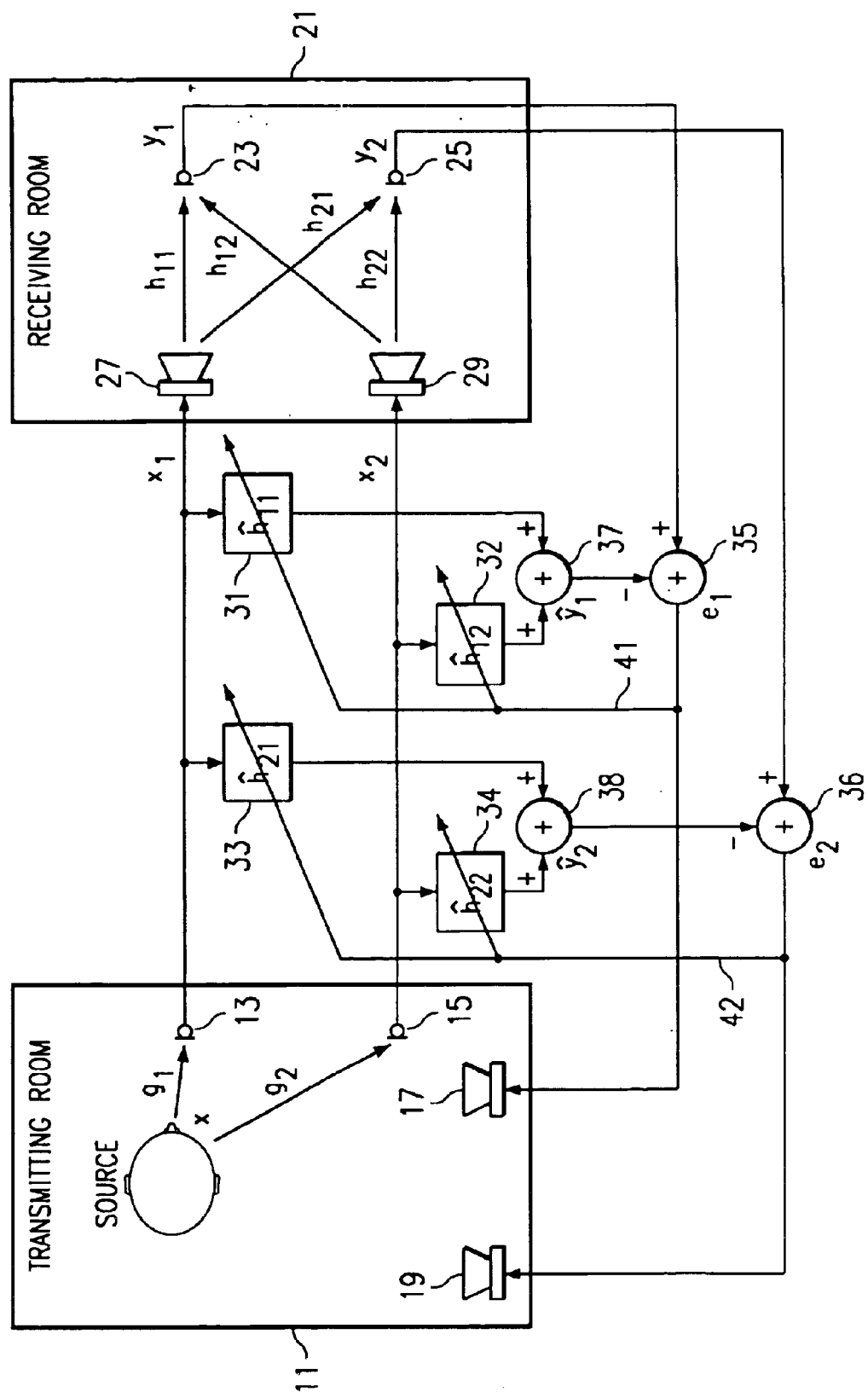
FIG. 1 illustrates a prior art stereophonic echo cancellation system.

FIG. 1 shows the configuration of a typical stereophonic echo cancellation system 10. The transmission room (depicted on the left) 11 has two microphones 13 and 15 that pick up the speech signal, x, via the two acoustic paths characterized by the impulse responses, $g_1$ and $g_2$. All acoustic paths are assumed to include the microphone and/or loudspeaker responses. The $i^{th}$ microphone output is then given by (in the frequency domain)

$$X_i(\omega)=G_1(\omega)X(\omega). \quad (1)$$

In this application, the upper-case letters represent the Fourier transforms of the time-domain signals denoted by the corresponding lower-case letters. The whole system is considered as a discrete-time system ignoring any A/D or D/A converter. These signals are presented through the set of loudspeakers 27 and 29 in the receiving room 21 (on the right in FIG. 1). Each microphone 23 and 25 in the receiving room picks up an echo ($y_1$, $y_2$ in FIG. 1) from each of the loudspeakers. Let $h_{ij}$ be the acoustic path impulse response from the $j^{th}$ loudspeaker to the $i^{th}$ microphone. In FIG. 1 the path from speaker 27 to microphone 23 is $h_{11}$, the path from speaker 27 to microphone 25 is $h_{21}$, the path from speaker 29 to microphone 25 is $h_{22}$ and from speaker 29 to microphone 23 is $h_{12}$. Then the echoes ($y_1$, $y_2$) picked up by the microphones 23 and 25 in the receiving room 21 are given by (in the frequency domain)

$$Y_i(\omega)=\Sigma_j H_{ij}(\omega)X_1(\omega) \quad (2)$$

In the absence of any AEC, the echoes $y_i$'s will be passed back to the loudspeaker 17, 19 in the transmission room 11 and will be recirculated again and again. This will cause multiple echoes or may even result in howling instability. Commonly used AEC systems use adaptive finite impulse response (FIR) filters that provide estimates of the echo path responses. The FIR filter coefficients are updated adaptively depending on the input signals to the loudspeakers and the outputs of the microphones.

In the stereophonic AEC, there are four echo paths ($h_{11}$, $h_{12}$, $h_{21}$, and $h_{22}$) to be identified. We, therefore, need four adaptive filters 31–34 as shown in FIG. 1. Filter 31 is the estimate for the $h_{11}$ path, filter 32 is the estimate for the $h_{12}$ path, filter 33 is the estimate for the $h_{21}$ path and filter 34 is the estimate for the $h_{22}$ path. The estimates $\hat{h}_{11}$ and $\hat{h}_{21}$ of paths to echo $y_1$ are summed at 37 and the estimates $\hat{h}_{21}$ and $\hat{h}_{22}$ of paths to echo $y_2$ are summed at 38. The output of the AEC filters (which can be thought of as an estimated echo) are as follows $$\hat{Y}_i(\omega) = \sum_j \hat{H}_{ij}(\omega)X_j(\omega)$$

These estimated echoes at 37 and 38 are subtracted at adders 35 and 36 from the true echoes from $y_1$ and $y_2$ giving the error signals ($e_1$ and $e_2$ in FIG. 1), $$E_i(\omega)=Y_i(\omega)-\hat{Y}_i(\omega)$$

These error signals are used to update the filter 31-34 coefficients (represented by feedback lines 41,42). Several techniques are available to calculate the filter updates (e.g., the least means square (LMS), the recursive least square (RLS), the affine projection (AP) algorithms, etc.). All these techniques attempt to minimize these error signals in one way or another.

The data available to the echo canceller are the inputs to the loudspeakers, $x_i$'s, as well as the outputs of the microphones, $y_i$'s, in the receiving room 21. The fundamental problem of stereophonic AEC systems is that given this set of data, it is not possible to uniquely determine the echo paths to drive the error, $e_i$'s to zero (i.e., to eliminate the echoes). In order to explain this, let us look at the error in one of the channels (similar analysis can be carried out for the other channels). In the frequency domain, this error is given by $$E_1(\omega) = \sum_j \left(H_{1j}(\omega) - \hat{H}_{1j}(\omega)\right)G_j(\omega)X(\omega)$$

Let us assume that somehow, we have been able to achieve perfect echo cancellation, i.e., we have $E_1(\omega)=0$. Assuming that $X(\omega)$ does not have zeros in the frequencies of interest, the above gives $$\sum_j \left(H_{1j}(\omega) - \hat{H}_{1j}(\omega)\right)G_j(\omega) = 0 \quad (3)$$

This equation does not imply $H_{ij}(\omega)=\hat{H}_{ij}(\omega)$. Therefore, even if the echo has been driven to zero, we have not necessarily achieved perfect alignment. In other words, the canceller has not necessarily identified the true echo path. In fact, the above equation has infinitely many solutions for $\hat{H}_{ij}$(107). Any adaptation algorithm may lead to any one of these solutions. Note that so long as the conditions in both the transmitting and the receiving rooms are fixed, this does not cause any problem as the echo will remain zero. However, the adaptation technique has to track not only the changes in the receiving room that change the echo path responses, $h_{ij}$, but also the changes in the conditions in the transmitting room as reflected through changes in $g_i$. Tracking the conditions in the transmitting room can be specially problematic as $g_i$ may change abruptly and by a large amount (e.g., one speaker stops talking and another speaker starts speaking from a different location).

A detailed discussion of this problem describing several viewpoints can be found in above cited references. Specially, the discussion in Benesty et al. provides a better understanding of the above problem both in terms of non-uniqueness and misalignment of the solutions.

As discussed above, the reason for the non-perfect alignment is that the two signals are correlated. Correlation between stereo signals do not allow sufficient identification of the echo path resources. Thus, in order to solve the problem, we have to find a technique to decorrelate the input signals to the loudspeakers, $x_i$, in such a way that it does not affect the stereo perception in the receiving room.

Figure 2:
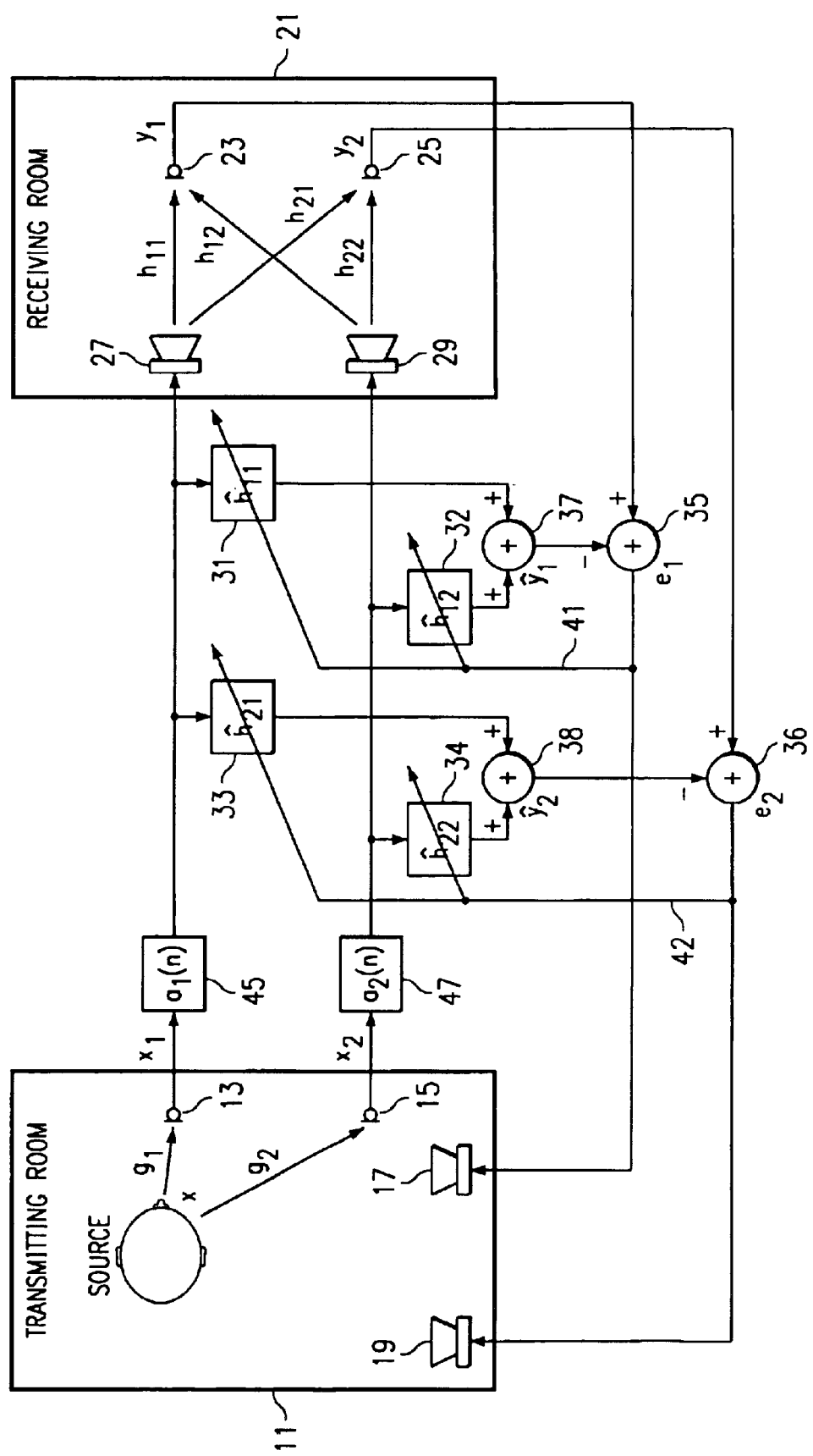
FIG. 2 illustrates a stereophonic echo cancellation system according to the present invention.

The system 40 for the stereophonic echo cancellation system is shown in FIG. 2. Each of the stereo signals is passed through a different all-pass filter 45, 47 denoted by $\alpha_i(n)$. The subscript n is used to indicate that the all-pass filter is time-varying (varying with n).

Rigorously speaking, there is no frequency domain representation of the time-varying filtering operation used in FIG. 2. However, if we assume that $\alpha_i(n)$ does not change much for a given window around time instant n, then it is possible to assign a frequency domain transfer function $A(\omega,n)$ to the filtering operation at time instant n. Then the frequency spectra of the output at time instant n can be formally written as $$Y_i(\omega, n) = \sum_j H_{ij}(\omega)A_j(\omega, n)X_j(\omega)$$

$$\hat{Y}_i(\omega, n) = \sum_j \hat{H}_{ij}(\omega)A_j(\omega, n)X_j(\omega)$$

Then the error in the $i^{th}$ path is $$E_i(\omega, n) = \sum_j \left(H_{ij}(\omega) - \hat{H}_{ij}(\omega)\right)A_j(\omega, n)G_j(\omega)X(\omega)$$

Now, if we can achieve perfect echo cancellation by setting $E_i(\omega,n)=0$, then the above implies $$\sum_j \left(H_{ij}(\omega) - \hat{H}_{ij}(\omega)\right)A_j(\omega, n)G_j(\omega)X(\omega) = 0$$

Since the above must be true for all n, i.e., for all variations of $A_j(\omega n,)$ with n, we must have $H_{ij}(\omega)=\hat{H}_{ij}(\omega)$. Thus, by using the time varying all-pass filter in the signal path, it is possible to achieve perfect alignment between the adaptive filter and the true echo path. In practice, perfect alignment is not possible due to the finite impulse response of the modeling filters (the adaptive filters) as well as due to the noise present in the signal. However, simulations show that this technique achieves much better identification of the echo paths than was otherwise possible.

The system 40 must follow certain constraints. First, the signals that are modified through the all-pass filters 45, 47 are played back through the loudspeaker in the receiving room 21. Therefore, the time-variation of the all-pass filters has to be chosen in such a way that does not alter the stereo perception of the speech. Second, since an adaptive filter will be used to identify the echo path responses, the time-variation of the all-pass filters should be fast enough so that the adaptive technique used cannot track the changes in the all-pass filters. On the other hand, it is desirable that the adaptive technique be able to track changes in the receiving room 21. These conflicting requirements show the importance of proper choice of the time-varying all-pass filters. In the following, we discuss one possible choice.

The simplest all-pass filter is a single-order filter that can be described by a single parameter $\alpha_i(n)$. The frequency response of such a system for a given n can be written as $$A_i(\omega, n) = \frac{e^{-jw} - \alpha_i(n)}{1 - \alpha_i(n)e^{-jw}}$$

Such a filter has several important features, namely
$|A_i(\omega,n)|=1.0$, $\forall \omega$ and $\forall n$, i.e., this filter passes all frequencies all the time unattenuated.
It only changes the phase of each frequency.
It is completely determined by a single time-varying parameter $\alpha_i(n)$. Thus, the design of the system involves proper choice of $\alpha_i(n)$.

In order for the all-pass filter $\alpha_i(n)$ to be stable, the absolute value of $\alpha_i(n)$ must be less than unity. Since all our signal is real, we have also restricted $\alpha_i(n)$ to be a real value. This also simplifies the filtering operation. $\alpha_i(n)$ is a time-varying parameter. Thus, we need to update $\alpha_i(n)$ at every time instant. The update rule for $\alpha_i(n)$ is as follows $$\alpha_i(n+1) = \alpha_i(n) + r_i(n),$$

set $\alpha_i(n+1) = \alpha_{i,max}$ if $\alpha_i(n+1) > \alpha_{i,max}$ set $\alpha_i(n+1) = \alpha_{i,min}$ if $\alpha_i(n+1) < \alpha_{i,min}$ \hfill (4)

Here, $r_i(n)$ is an independent and identically distributed (iid) random variable having a uniform probability distribution function (pdf) over the interval $[-R_i, R_i]$. $R_i$ indicates the maximum allowable deviation of $\alpha_i(n)$ from one instant to another. This deviation corresponds to phase jitter introduced by the time-varying all-pass filter for the $i^{th}$ channel. $R_i$ should be made as large as possible to introduce enough signal decorrelation. However, too large a value of $R_i$ will result in noticeable change in speech perception.

$\alpha_{i,max}$ and $\alpha_{i,min}$ in equation (4), represent the maximum and minimum allowable values of $\alpha_i(n)$ or the bounded random variable. In order to ensure stability, we must have $\alpha_{i,max} < 1$ and $\alpha_{i,min} > -1$. Further restrictions are also required to maintain transparency in speech perception. These restrictions are derived from the data known as "just noticeable inter-aural delay" in psychoacoustics. A discussion of this is found in E. Zwicker and H. Fastl, *Psychoacoustics: Facts and Models,* Heidelberg, Germany: Springer-Verlag, 1990. This data represents the minimum change in the inter-aural time delay between the two ears at a given frequency that causes a noticeable change in the perception of the direction of sound. The all-pass filter changes the phase of each frequency of the input speech. The effect of this phase change is to change the time arrival of the signal at each frequency in the ears. So, if we limit the phase changes so that the change in the time of arrival for each channel is within the just noticeable inter-aural delay, then spatial perception of stero signal will not be affected. The just noticeable inter-aural delay varies between 30 $\mu$sec. to 200 $\mu$sec. We have chosen to limit the change in the time of arrival of each frequency within 60 $\mu$sec. This leads to the following values of $\alpha_{i,max}$ and $\alpha_{i,min}$, $\alpha_{i,max} = 0$ and $\alpha_{i,min} = -0.9$.

Figure 3:
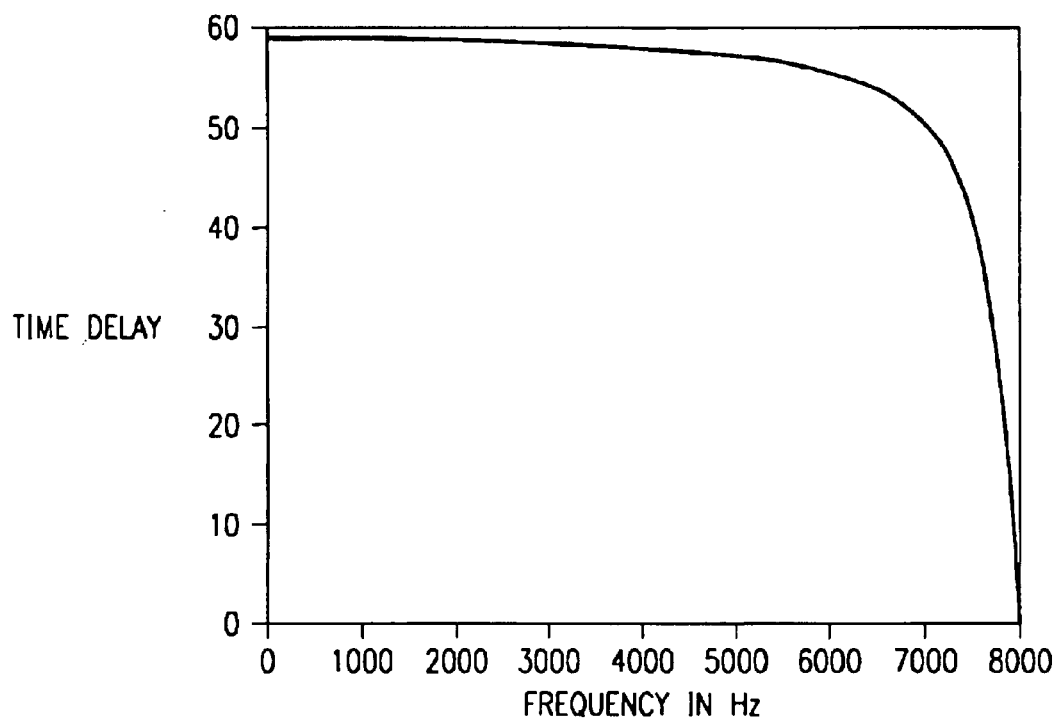
FIG. 3 is a plot of time delay vs. frequency for all-pass filters with $\alpha_{i,min}=-0.9$ and $\alpha_{i,max}=0$ in FIG. 2.

FIG. 3 shows the time delay as function of frequency for the two all-pass filters with $\alpha_{i,min} = -0.9$ and $\alpha_{i,max} = 0$. Since the value of $\alpha_{i,min}$ for the all-pass filters in the two stereo paths are kept within these limits, the resulting inter-aural delay are also within 60 $\mu$sec. Our experiments have shown that this choice leads to good signal decorrelation to allow correct identification of echo path responses and also keeps the stereo perception of speech unchanged.

In order to evaluate the technique, we collected stereo speech samples in our audio laboratory. The audio laboratory was used as the transmitting room. We had two speakers talking alternately in the room when two microphones were used to collect the data. The data were sampled at 16 kHz sampling rate. In one set of data, the speakers were asked to stand still while talking. This was made to ensure that the echo path responses remain the same. In another set, they were free to move around the room as they talked into the microphones. We then used our technique to decorrelate the collected stereo signals. We performed informal listening tests by playing the original and the modified stereo signals over both loudspeakers and headphones. All these tests show that the stereo perception of the modified signal is indistinguishable from that of the original.

Figure 4:
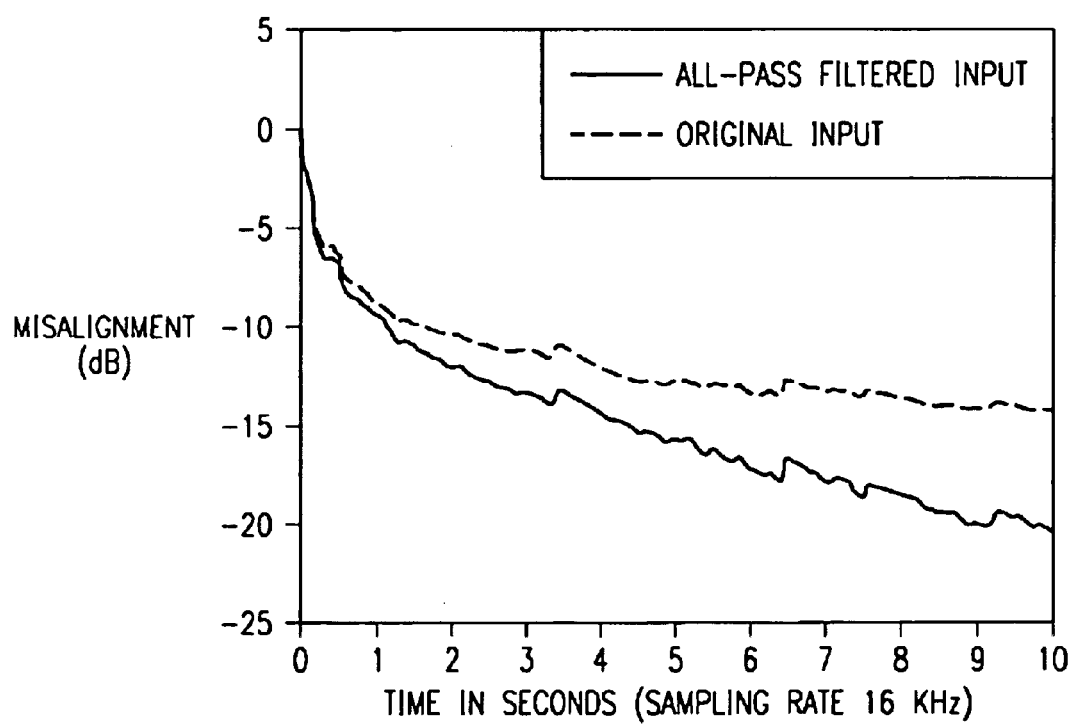
FIG. 4 illustrates behavior of misalignment with original signal without the all-pass filtered input and according to the present invention with the all-pass filtered input.

We simulated the receiving room loudspeaker outputs by convolving the stereo signals using the echo path responses $h_{11}$ and $h_{12}$. These two echo path responses were obtained using the image method of Allen et al. based on room measurements of one of our conference rooms. For more details on Allen, et al. see the following reference: J. Allen and D. Berkley, "Image Method for Efficiently Simulating Small-Room Acoustics," *J. Acoust. Soc. Am.,* Vol. 65, No. 4, pp. 943–950, April 1979. The microphone output in the receiving room was simulated by summing up the outputs of these two convolution. In the above convolutions, we restricted the lengths of the echo path responses to be N=4096 samples longs. We then used the two adaptive filters $\hat{h}_{11}$ and $\hat{h}_{12}$ each of length L=2048 samples, to identify these echo path responses. We used the fast affine projection technique of order 8 for updating the filter coefficients. See Shimauchi et al., a reference cited above. FIG. 4 shows the misalignment in dB with time. The misalignment is defined as $$10 * \log_{10} \frac{\|h_{11,1:2048} - \hat{h}_{11}\|_2^2 + \|h_{12,1:2048} - \hat{h}_{12}\|_2^2}{\|h_{11,1:2048}\|_2^2 + \|h_{12,1:2048}\|_2^2}$$

where the subscript 1:2048 is used to indicate that the first 2048 samples of the corresponding echo path responses have been used here. This figure corresponds to the set of data when the transmitting room echo path responses were kept fixed as already described. The dotted line corresponds to the case of original signal and the solid line to the case of modified data using our technique of time-varying all-pass filtering.

Since we have used 'real-world' collected data for the transmitted signals, the situation was not as bad as when simulated data was used. We did not experience sudden jumps, but misalignment settles down at around −14 dB whereas with our technique of signal decorrelation, the misalignment goes below −20 dB.

What is claimed is:

1. In a communication system having a plurality of microphones at a transmitting location transmitting over separate corresponding plurality of channels to corresponding speakers in a receiving location and a plurality of microphones at the receiving location coupled over corresponding plurality of channels to speakers at the transmitting location generating echo signals, a multi-channel acoustic cancellation system comprising:

filter means coupled to output of said plurality of microphones at said transmitting location and input to said plurality of speakers at receiving location for providing estimated signals representing estimates of echo path responses from said plurality microphones from said receiving location to said plurality of speakers at said transmitting location;

means coupled to input of said plurality of speakers at said transmitting location and output of said microphones at said receiving location for providing true signals representing true echo signal;

means for subtracting said true signals from said estimated signals to reduce echo signals and to obtain coefficient control signals representing errors;

means for coupling said coefficient control signals to said filter means to change the filter coefficients to minimize said errors; and means for providing decorrelation of said signals using all-pass filters in said channels having different time varying filtering parameter; said time varying filtering parameter being a bounded random variable.

2. The system of claim 1 wherein said bounded random variable has bounded values based on data for just noticable time delay difference from psychoacoustics.

3. The system of claim 2 where the noticeable delay is between 30 and 200 microseconds.

4. The system of claim 1 where the filter means include finite impulse response (FIR) filters that have filter coefficients updated adaptively depending on the input signals to the loudspeakers and outputs of the microphones.

5. A multi-channel acoustic cancellation system comprising:

filter means coupled to output of a plurality of microphones at a transmitting location and input to a plurality of speakers at a receiving location for providing estimated signals representing estimates of echo path responses from a plurality microphones from said receiving location to a plurality of speakers at said transmitting location;

means coupled to input of said plurality of speakers at said transmitting location and output of said plurality of microphones at said receiving location for providing true signals representing true echo signal;

means for subtracting said true signals from said estimated signals to reduce echo signals and to obtain coefficient control signals representing errors;

means for coupling said coefficient control signals to said filter means to change the filter coefficients to minimize said errors; and means for providing decorrelation of said signals in said separate corresponding plurality of channels by providing an all-pass filter having different time varying filtering parameter in each channel wherein said time varying filtering parameter takes a bounded random variable.

6. The system of claim 5 wherein said bounded random variable has bounded values based on data for just noticable time delay difference from psychoacoustics.

7. The system of claim 6 where the noticeable delay is between 30 and 200 microseconds.

8. A multi-channel acoustic cancellation system comprising:

means coupled in a signal path between a transmitting location and a receiving location for reducing echo errors and means in said signal path for providing decorrelation of signals in separate corresponding plurality of channels by providing an all-pass filter having different time varying filtering parameter in each channel wherein said time varying filtering parameter takes a bounded random variable.

9. The system of claim 8 wherein said bounded random variable has bounded values based on data for just noticable time delay difference from psychoacoustics.

10. The system of claim 9 where the noticeable delay is between 30 and 200 microseconds.

* * * * *